United States Patent
Xu et al.

(10) Patent No.: US 9,281,997 B2
(45) Date of Patent: Mar. 8, 2016

(54) BUILDING BASEBAND UNIT, BASEBAND PROCESSING PANEL, AND FAILURE PROCESSING METHOD FOR BASEBAND PROCESSING PANEL

(75) Inventors: Lingjun Xu, Beijing (CN); Guanghui Cheng, Beijing (CN); Dong Wang, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 108 days.

(21) Appl. No.: 14/128,141

(22) PCT Filed: Jul. 5, 2012

(86) PCT No.: PCT/CN2012/078219
§ 371 (c)(1),
(2), (4) Date: Dec. 20, 2013

(87) PCT Pub. No.: WO2013/007161
PCT Pub. Date: Jan. 17, 2013

(65) Prior Publication Data
US 2014/0126353 A1    May 8, 2014

(30) Foreign Application Priority Data

Jul. 11, 2011 (CN) .......................... 2011 1 0193243

(51) Int. Cl.
*G01R 31/08* (2006.01)
*H04L 12/24* (2006.01)
(Continued)

(52) U.S. Cl.
CPC .............. *H04L 41/0668* (2013.01); *G06F 1/28* (2013.01); *G06F 11/16* (2013.01); *H04B 1/745* (2013.01); *H04L 41/0659* (2013.01); *H04W 24/04* (2013.01); *H04L 25/02* (2013.01)

(58) Field of Classification Search
CPC ..... H04W 24/00; H04W 24/02; H04W 24/06; H04W 24/08; H04W 24/10; H04L 41/0654; H04L 25/00; H04L 25/02

USPC ......... 370/216–222, 240–245, 329–331, 389; 709/208–211
See application file for complete search history.

(56) References Cited

U.S. PATENT DOCUMENTS 8,447,294 B2   5/2013   Zhang et al.
(Continued)

FOREIGN PATENT DOCUMENTS

CN         101159933 A        4/2008
(Continued)

OTHER PUBLICATIONS

International Search Report (in Chinese with English translation) and Written Opinion (in Chinese) for PCT/CN2012/078219, mailed Nov. 8, 2012; ISA/CN.
(Continued)

*Primary Examiner* — Hanh N Nguyen
(74) *Attorney, Agent, or Firm* — Harness, Dickey & Pierce, P.L.C.

(57) ABSTRACT

Disclosed are a building baseband unit, a baseband processing panel, and a failure processing method for the baseband processing panel. A direct path is introduced respectively for a baseband processing module and a power supply module in a baseband processing panel; when the baseband processing module has failed, the baseband processing module is directly bypassed, and a part of the baseband processing resources of a baseband processing panel in normal operation is allocated to an RRU corresponding to the failed baseband processing panel via a back panel and the direct path; and when both the baseband processing module and the power supply module have failed, both of them are directly bypassed, and a part of the baseband processing resources of a baseband processing panel in normal operation is allocated to the RRU corresponding to the failed baseband processing panel via the back panel and the direct path, and at the same time the power required for working is provided to an optical module via the back panel and another direct path. Applying the solution of the present invention can reduce implementation costs.

12 Claims, 3 Drawing Sheets

(51) Int. Cl.
*H04W 24/04* (2009.01)
*H04B 1/74* (2006.01)
*G06F 1/28* (2006.01)
*G06F 11/16* (2006.01)
*H04L 25/02* (2006.01)

(56) References Cited

U.S. PATENT DOCUMENTS

| | | |
|---|---|---|
| 8,498,659 B2 | 7/2013 | He et al. |
| 8,768,416 B2 | 7/2014 | He et al. |
| 2004/0105509 A1* | 6/2004 | McGowan et al. ........... 375/296 |
| 2008/0214124 A1 | 9/2008 | Saitou et al. |
| 2010/0093282 A1* | 4/2010 | Martikkala et al. .......... 455/63.4 |
| 2011/0130100 A1* | 6/2011 | Chen et al. ................ 455/67.11 |
| 2011/0201268 A1 | 8/2011 | He et al. |
| 2011/0269454 A1 | 11/2011 | Zhang et al. |
| 2013/0288752 A1 | 10/2013 | He et al. |
| 2014/0287798 A1 | 9/2014 | He et al. |

FOREIGN PATENT DOCUMENTS

| | | |
|---|---|---|
| CN | 101426303 A | 5/2009 |
| CN | 101951622 A | 1/2011 |
| EP | 2352358 A1 | 8/2011 |
| EP | 2384045 A1 | 11/2011 |
| WO | WO-2010048871 A1 | 5/2010 |
| WO | WO-2010081330 A1 | 7/2010 |

OTHER PUBLICATIONS

Extended European Search Report regarding Application No. 12811814.8, dated Jul. 17, 2015.

* cited by examiner

BUILDING BASEBAND UNIT, BASEBAND PROCESSING PANEL, AND FAILURE PROCESSING METHOD FOR BASEBAND PROCESSING PANEL

This application is a National Stage application of PCT international application PCT/CN2012/078219, filed on Jul. 5, 2012 which claims the priority to Chinese Patent Application No. 201110193243.8, entitled "BUILDING BASEBAND UNIT, BASEBAND PROCESSING BOARD, AND FAILURE PROCESSING METHOD FOR BASEBAND PROCESSING BOARD", filed with the Chinese Patent Office on Jul. 11, 2011, both of which are incorporated herein by reference in their entirety.

FIELD OF THE DISCLOSURE

The disclosure relates to wireless communication technique, and particularly to a baseband processing unit, a baseband processing board and a failure processing method for the baseband processing board.

BACKGROUND

Currently, in Third Generation (3G) mobile communication system and Long Term Evolution (LTE) system, usually distributed base station architecture is adopted for the base stations, i.e., the whole base station includes two parts: BaseBand processing Unit (BBU) and Radio Remote Unit (RRU). The BBU is mainly used to achieve functions of baseband processing, main control, transmission, clock, etc., while the RRU is mainly used to achieve functions of conversion between digital baseband signal and RF (Radio Frequency) signal, etc., The interface between the BBU and the RRU is a fiber optic interface.

Figure 1:
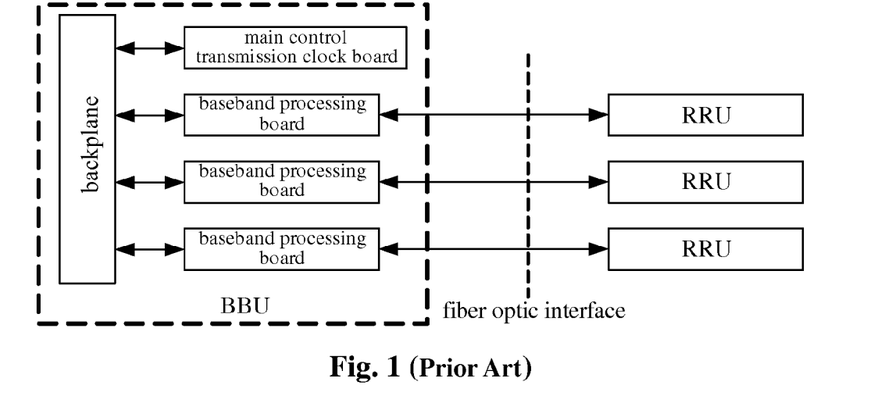
FIG. 1 is a schematic diagram of compositional structure of a typical BBU with a three-sector configuration in the prior art.

FIG. 1 is a schematic diagram of compositional structure of a typical BBU with a three-sector configuration in the prior art. As shown in FIG. 1, the BBU includes: a main control transmission clock board, a baseband processing board and a backplane. The main control transmission clock board may be abbreviated as "main control board", which is mainly used for main control, transmission and clock functions. Usually, all the processes over the BBU control level are performed by the main control transmission clock board. Thus, the main control transmission clock board is a nerve center of the whole BBU, which not only controls the operations of single-boards, but also provides clock signals and transmission interfaces for the single-boards. The baseband processing board can be abbreviated as "baseband board", which is mainly adapted to perform the layer 1 and the layer 2 processes. The backplane is a PCB (Printed Circuit Board) mounted at the back of the BBU frame, which is adapted to interconnect among individual single-boards. The signal transmission between the individual single-boards and the power supply for the individual single-boards are all achieved by backplane bus, thereby avoiding the cable tangles of interconnection among the individual single-boards. In this way, the whole system has a very high reliability and easy maintenance.

In practice, each baseband processing board and its corresponding RRU are jointly responsible for the related processes of one cell, and thus the failure of any one of the baseband processing boards may lead to the failure of the cell for which the baseband processing board is responsible until the whole cell is out of service. In this case, the users in the whole cell can not communicate normally.

Figure 2:
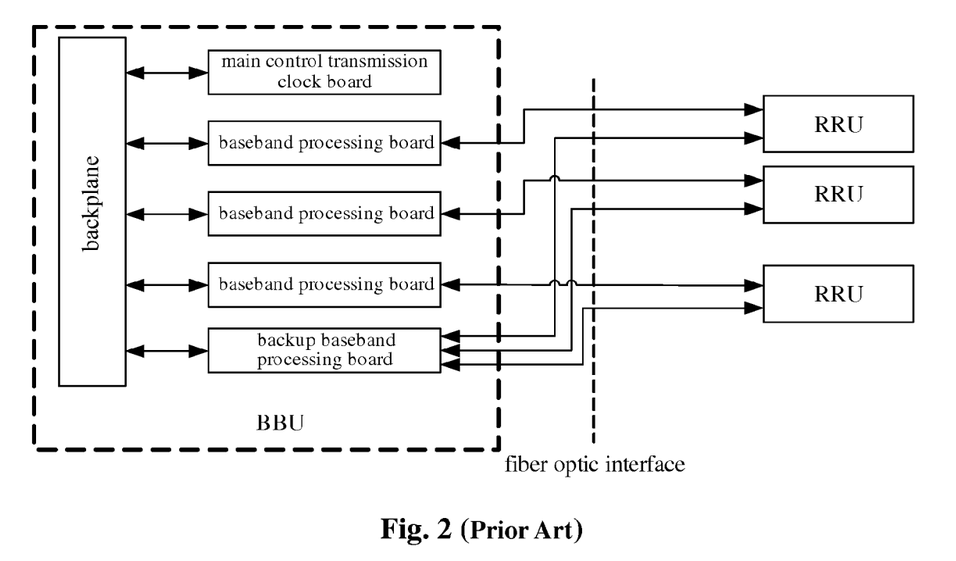
FIG. 2 is a schematic diagram of an arrangement way of a backup baseband processing board in the prior art.

To solve the above problems, in the prior art, a backup baseband processing board is additionally provided in the BBU. The backup baseband processing board is connected with all RRUs. FIG. 2 is a schematic diagram of an arrangement way of a backup baseband processing board in the prior art. Once any one of the baseband processing board fails, the failed baseband processing board is replaced by this backup baseband processing board.

However, there are some problems for the way described above in practice, i.e., due to the additionally provided backup baseband processing board, accordingly the number of fiber optic interfaces is required to be doubled, and thus the implementation costs are relatively high.

SUMMARY

In view of this, the main object of the disclosure is to provide a baseband processing unit which can reduce implementation costs.

Another object of the disclosure is to provide a baseband processing board which can reduce implementation costs.

Yet another object of the disclosure is to provide a failure processing method for the baseband processing board which can reduce implementation costs.

To achieve the above objects, the technical solution of the disclosure is implemented as follows.

A baseband processing unit includes: a backplane and at least two baseband processing boards, in which each of the baseband processing boards includes a baseband processing module, a power supply module and an optical module, and at least one of the baseband processing boards further includes: a first direct path connected in parallel with the baseband processing module and a second direct path connected in parallel with the power supply module;

in the case that failures occur on both the baseband processing module and the power supply module in a first baseband processing board including the first direct path and the second direct path, the first baseband processing board operates in a first operation mode, where the first operation mode includes: obtaining baseband processing resources and power supply required for operation via the backplane, and providing the obtained baseband processing resources to a corresponding radio remote unit via the first direct path and the optical module, and providing the obtained power supply to the optical module via the second direct path; and in the case that a failure occurs on the baseband processing module in the first baseband processing board, but no failure occurs on the power supply module in the first baseband processing board, the first baseband processing board operates in a second operation mode, where the second operation mode includes: obtaining the baseband processing resources required for operation via the backplane, providing the obtained baseband processing resources to the corresponding radio remote unit via the first direct path and the optical module, and supplying the optical module with power by the power supply module of the baseband processing board.

A baseband processing board includes: a baseband processing module, a power supply module and an optical module, where the baseband processing board further includes a first direct path connected in parallel with the baseband processing module and a second direct path connected in parallel with the power supply module;

in the case that failures occur on both the baseband processing module and the power supply module, the baseband processing board operates in a first operation mode, where the first operation mode includes: obtaining baseband processing resources and power supply required for operation via a backplane in a baseband processing unit with the baseband processing board, providing the obtained baseband processing resources to a corresponding radio remote unit via the first direct path and the optical module, and providing the obtained power supply to the optical module via the second direct path; and in the case that a failure occurs on the baseband processing module but no failure occurs on the power supply module, the baseband processing board operates in a second operation mode, where the second operation mode includes: obtaining the baseband processing resources required for operation via the backplane, providing the obtained baseband processing resources to a corresponding radio remote unit via the first direct path and the optical module, and supplying the optical module with power by the power supply module of the baseband processing board.

A failure processing method for a baseband processing board in the baseband processing unit described above includes:

switching, by the first baseband processing board, operation modes of the first baseband processing board according to an obtained operation mode switching instruction, wherein the operation modes comprise a first operation mode and a second operation mode;

in the case that the operation mode of the first baseband processing board is switched to the first operation mode, obtaining baseband processing resources and power supply required for operation via the backplane, providing the obtained baseband processing resources to a corresponding radio remote unit via the first direct path and the optical module, and providing the obtained power supply to the optical module via the second direct path; and in the case that the operation mode of the first baseband processing board is switched to the second operation mode, obtaining the baseband processing resources required for operation via the backplane, providing the obtained baseband processing resources to the corresponding radio remote unit via the first direct path and the optical module, and supplying the optical module with power by the power supply module of the baseband processing board itself.

Therefore, in the solution described in the disclosure, by introducing two direct paths in the baseband processing board, it can ensure that when the baseband processing board fails, the corresponding cell won't be out of service. Compared with the prior art, implementation costs can be significantly reduced. Further, the solution described in the disclosure can be simply and easily implemented, which is worth to be applied for BBU products.

DETAILED DESCRIPTION

For the problems in the prior art, an improved BBU, a baseband processing board and a failure processing method for the baseband processing board are provided according to the disclosure.

Figure 3:
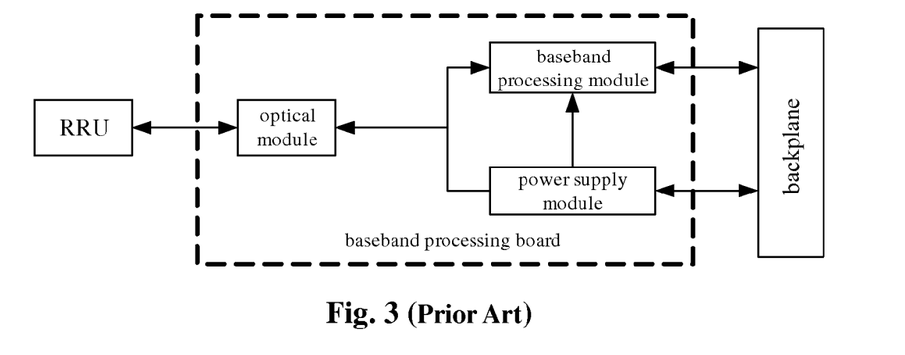
FIG. 3 is a schematic diagram of compositional structure of a baseband processing board in the prior art.

FIG. 3 is a schematic diagram of compositional structure of a baseband processing board in the prior art. As shown in FIG. 3, the baseband processing board includes: a baseband processing module, a power supply module and an optical module. The baseband processing module is mainly adapted to perform processes for the layer 1 and the layer 2. The power supply module is mainly adapted to convert the power supply (DC power supply) obtained from a backplane into power supply (DC power supply) required for operations of the baseband processing module and the optical module, and provide the converted power supply to the baseband processing module and the optical module. The optical module is mainly adapted to convert between an electric signal and an optical signal.

Compared with the baseband processing module and the power supply module, the optical module has a much higher reliability. That is, the failure probability of the optical module is much less than that of the baseband processing module and the power supply module. Therefore, in the disclosure, two direct paths, i.e., a first direct path connected in parallel with the baseband processing module and a second direct path connected in parallel with the power supply module, are respectively introduced for the baseband processing module and the power supply module.

Thus, when failures occur on both the baseband processing module and the power supply module, the baseband processing board may operate in a first operation mode. The first operation mode includes: obtaining baseband processing resources and power supply required for operation via a backplane, providing the obtained baseband processing resources to a corresponding RRU (Radio Remote Unit) via the first direct path and the optical module, and providing the obtained power supply to the optical module via the second direct path. When a failure occurs on the baseband processing module, but no failure occurs on the power supply module, the baseband processing board may operate in a second operation mode. The second operation mode includes: obtaining the baseband processing resources required for operation via the backplane, providing the obtained baseband processing resources to the corresponding RRU via the first direct path and the optical module, and providing a power supply to the optical module by the power supply module of the baseband processing board itself.

The baseband processing board described above may switch its operation modes under the control of a main control transmission clock board in the BBU where the baseband processing board is located. For example, the main control transmission clock board periodically detects the operation state of the baseband processing board, i.e., the main control transmission clock board periodically detects whether a failure occurs in the baseband processing module and the power supply module in the baseband processing board. Then, the main control transmission clock board controls the baseband processing board to operate in a corresponding operation mode according to the detection result. Specifically, when both the baseband processing module and the power supply module fail, the baseband processing board is controlled to switch to the first operation mode; and when the baseband processing board fails but the power supply module does not fail, the baseband processing board is controlled to switch to the second operation mode. If both the baseband processing module and the power supply module are normal, the baseband processing board operates in a mode in the prior art.

In practice, the baseband processing board described above may further include a first switch and a second switch. The first switch is adapted to connect the optical module with the first direct path or the baseband processing module. The second switch is adapted to connect the optical module with the power supply module or the second direct path. One end of the first direct path that is not connected with the first switch is connected with the backplane. One end of the second direct path that is not connected with the second switch is connected with the backplane. When the baseband processing board operates in the first operation mode, the first switch is connected with the first direct path, and the second switch is connected with the second direct path. When the baseband processing board operates in the second operation mode, the first switch is connected with the first direct path, and the second switch is connected with the power supply module.

It should be noted that the arrangement way of the switch described above is just an example for illustration, and is not used to limit the technical solution of the disclosure. Other arrangement way may also be applied as long as it can achieve the same object.

To make the technical solution of the disclosure more apparent, hereinafter the solution according to the disclosure will be further described in detail by using embodiments in conjunction with the drawings.

Figure 4:
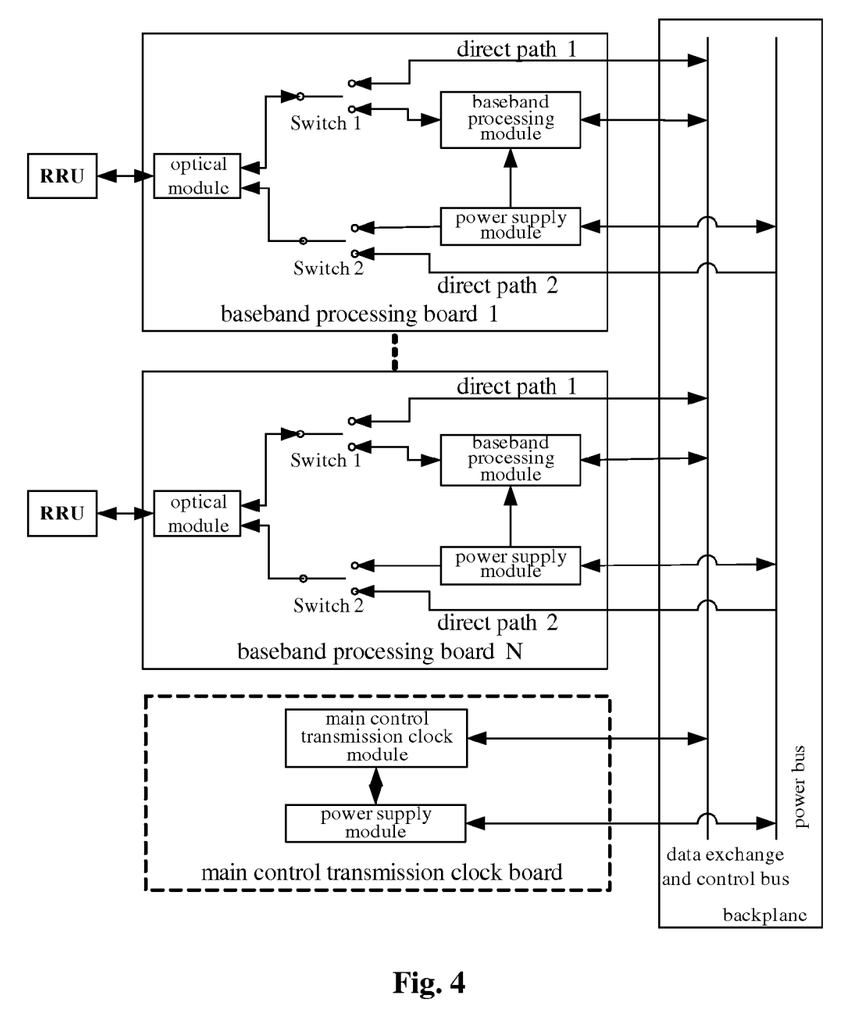
FIG. 4 is a schematic diagram of compositional structure of a BBU according to the disclosure.

FIG. 4 is a schematic diagram of compositional structure of a BBU according to the disclosure. As shown in FIG. 4, the same with the prior art is that the BBU includes a main control transmission clock board, a backplane and at least two baseband processing boards. Each of the baseband processing boards specifically includes a baseband processing module, a power supply module and an optical module. The solution according to the disclosure differs from the prior art in that at least one of the baseband processing boards further includes a switch 1, a switch 2, a direct path 1 and a direct path 2. In the embodiment, it is assumed that each of the baseband processing boards includes a switch 1, a switch 2, a direct path 1 and a direct path 2.

The switch 1 and the switch 2 can be a SPDT switch (Single-Pole Double Throw switch). The switch 1 is adapted to switch the connection between the baseband processing module/direct path 1 and the optical module, i.e., to connect the optical module with the direct path 1 or the baseband processing module. The switch 2 is adapted to switch the connection between the power supply module/direct path 2 and the optical module, i.e., to connect the optical module with the power supply module or the direct path 2.

There are four switching states in total for two switches. In theory, four switching states may correspond to four different operation states of the baseband processing board, i.e., failures occur on both the baseband processing module and the power supply module, a failure occurs on the baseband processing module but no failure occurs on the power supply module, no failure occurs on the baseband processing module but a failure occurs on the power supply module fails, and both the baseband processing module and the power supply module are operated normally. However, since the power supply for the baseband processing module is provided by the power supply module, the baseband processing module should fail if the power supply module fails. Therefore, the operation state in which no failure occurs on the baseband processing module but a failure occurs on the power supply module does not exist, i.e., actually there are only three different operation states, in which failures occur on both the baseband processing module and the power supply module, a failure occurs on the baseband processing module but no failure occurs on the power supply module, and both the baseband processing module and the power supply module are operated normally.

Both the direct path 1 and the direct path 2 are composed of several transmission lines. When the baseband processing module fails, baseband data may be transmitted between the backplane and the switch 1 via the direct path 1, and when the power supply module fails, the power supply for the optical module can be transmitted between the backplane and the switch 2 via the direct path 2.

The main control transmission clock board can periodically detect the operation state of each baseband processing board X (baseband processing board X represents any one of the baseband processing boards), and control the baseband processing board X to operate in a different operation mode according to the detection result.

1) First Operation Mode

If failures occur on both the baseband processing module and the power supply module, the baseband processing board X is controlled to operate in the first operation mode. In this case, the optical module is connected with the direct path 1 via the switch 1, and is connected with the direct path 2 via the switch 2. One baseband processing board in normal operation allocates a part of its own baseband processing resources to the RRU corresponding to the baseband processing board X via the backplane, the direct path 1, the switch 1 and the optical module. The optical module obtains the power supply required for operation from the backplane via the switch 2 and the direct path 2.

In this mode, both the baseband processing module and the power supply module are in a bypass state.

The baseband processing board which allocates a part of its own baseband processing resources to the RRU corresponding to the baseband processing board X may be any one which is randomly selected from all the baseband processing boards in normal operation by the main control transmission clock board, or may also be a baseband processing board with a lowest traffic load which is selected from all the baseband processing boards in normal operation by the main control transmission clock board. Of course, other ways can also be used to select, which is no limited in the disclosure.

Usually, the baseband processing resources of each baseband processing board may be divided into multiple parts. Therefore, when the baseband processing module in the baseband processing board X fails, the selected baseband processing board can divide its own baseband processing resources, for example, a 20 MHz carrier is divided into two 10 MHz carriers, one is allocated to the RRU corresponding to its own, and the other is allocated to the RRU corresponding to the baseband processing board X.

Further, the power supply for the optical module can be provided by the power supply module in the main control transmission clock board (as shown in FIG. 4, the main control transmission clock board includes a main control transmission clock module and a power supply module), or provided by a power supply module in a baseband processing board in normal operation. The baseband processing board that provides the power supply for the baseband processing board X and the baseband processing board that provides the baseband processing resources for the baseband processing board X may be the same, or may be different.

As shown in FIG. 4, the backplane includes a data exchange and control bus and a power bus. Specifically, the selected baseband processing board in normal operation allocates a part of its own baseband processing resources to the RRU corresponding to the baseband processing board X via the data exchange and control bus in the backplane, the direct path 1, the switch 1 and the optical module. The optical module in the baseband processing board X obtains the power supply required for operation from the backplane via the power bus in the backplane, the direct path 2 and the switch 2.

Figure 5:
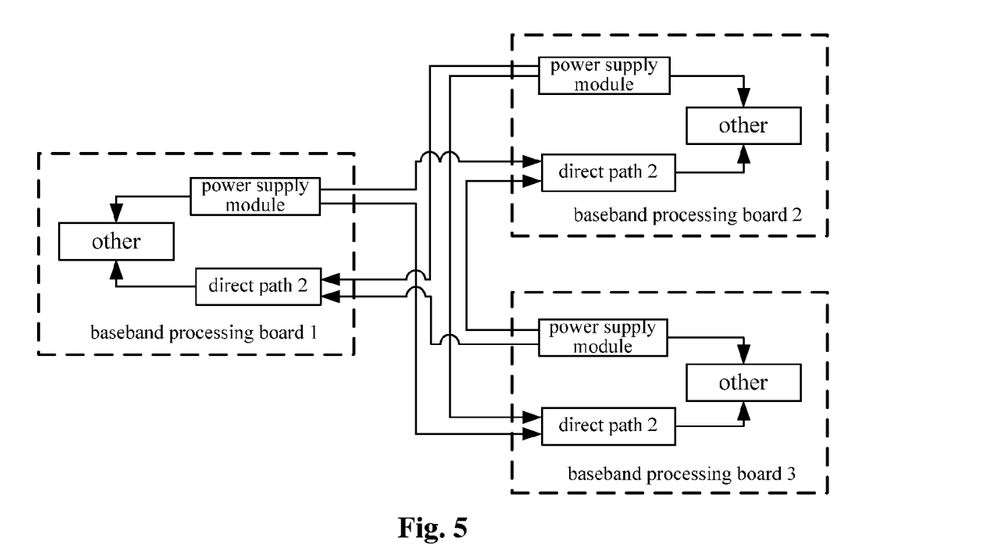
FIG. 5 is a schematic diagram of a star connection relationship between power supply modules and direct paths 2 in the disclosure.

To achieve the solution described in the disclosure, a start connection relationship is required to constitute between the power supply module in each baseband processing board and the direct paths 2 in other baseband processing boards. A star connection relationship is also required to constitute between the direct path 2 in each baseband processing board and the power supply modules in other baseband processing boards. As shown in FIG. 5, a schematic diagram of a star connection relationship between power supply modules and direct paths 2 in the disclosure is shown. Although the power supply module in each baseband processing board is connected with the direct paths 2 in other baseband processing boards via a certain transmission line in the power bus, due to a switch 2 between the direct path 2 and the optical module, the optical module may be supplied with power by the power supply module in other baseband processing board only after the switch 2 corresponding to the failed power supply module is connected to the direct path 2. Similarly, a star connection relationship is required to constitute between the baseband processing module in each baseband processing board and the direct path 1 in other baseband processing boards.

2) Second Operation Mode

If the baseband processing module fails but the power supply module does not fail, the baseband processing board X is controlled to operate in the second operation mode. In this case, the switch 1 is connected with the direct path 1, the switch 2 is connected with the power supply module, and one baseband processing board in normal operation allocates a part of its own baseband processing resources to the RRU corresponding to the baseband processing board X via the backplane, the direct path 1, the switch 1 and the optical module.

In this mode, the baseband processing module is in a bypass state.

Since no failure occurs on the power supply module in the baseband processing board X, the power supply for the optical module is still provided by this power supply module.

3) Third Operation Mode

If both the baseband processing module and the power supply module are operated normally, the baseband processing board X is controlled to operate in a third operation mode. In this case, the switch 1 is connected with the baseband processing module, and the switch 2 is connected with the power supply module.

In this mode, both the direct path 1 and the direct path 2 are opened, the baseband processing module and its corresponding RRU are jointly responsible for the processes for a cell.

In the disclosure, the main control transmission clock periodically detects the operation state of the baseband processing board X, and the value of the period may be set according to actual requirements. If the current detection result is the same as the last detection result, the baseband processing board X keeps in its current operation mode, i.e. its operation mode is not changed. If the current detection result is different from the last detection result, the operation mode of the baseband processing board X is switched to a corresponding operation mode.

For example, assuming that the $N^{th}$ detection result is that the baseband processing module fails but the power supply module does not fail, the baseband processing board X operates in the second operation mode, in which N is a positive integer. After a certain period, the $(N+1)^{th}$ detection is performed. If the $(N+1)^{th}$ detection result is the same as the $N^{th}$ detection result, the baseband processing board X keeps the operation in the second operation mode. If the $(N+1)^{th}$ detection result is different from the $N^{th}$ detection result, for example, failures occurs on both the baseband processing module and the power supply module, the baseband processing board X is changed to be operated in the first operation mode.

How to control the baseband processing board X to operate in a corresponding operation mode by the main control transmission clock board is well known by those skilled in the art.

Figure 6:
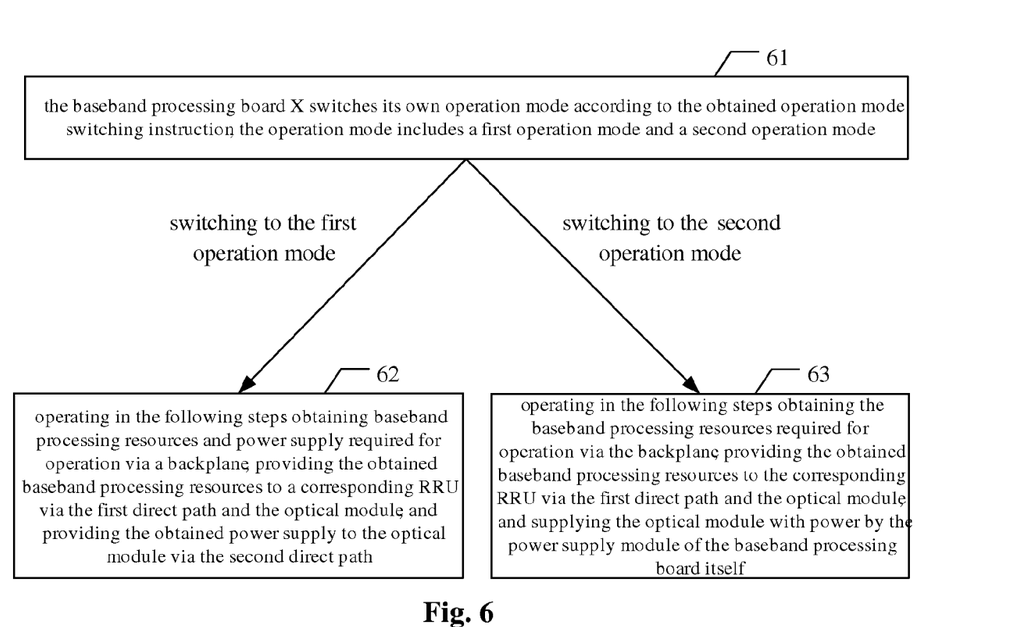
FIG. 6 is a flow chart of an embodiment of a failure processing method for a baseband processing board according to the disclosure.

Based on the above introduction, FIG. 6 is a flow chart of an embodiment of a failure processing method for a baseband processing board according to the disclosure. The method is implemented based on the BBU shown in FIG. 4. As shown in FIG. 6, the method includes the steps 61-63.

Step 61: switching, by the baseband processing board X, operation modes thereof according to an obtained operation mode switching instruction. The operation modes include a first operation mode and a second operation mode. If the operation mode of the baseband processing board X is switched to the first operation mode, step 62 is performed. If the operation mode of the baseband processing board X is switched to the second operation mode, step 63 is performed.

The instruction may be sent from the main control transmission clock board.

Step 62: operating in the following steps: obtaining baseband processing resources and power supply required for operation via a backplane, providing the obtained baseband processing resources to a corresponding RRU via the first direct path and the optical module, and providing the obtained power supply to the optical module via the second direct path.

The power supply for the optical module may be provided by the power supply module in the main control transmission clock board, or provided by the power supply module in a baseband processing board in normal operation.

Further, the baseband processing resources obtained by the baseband processing board X may be provided by a baseband processing board in normal operation. The baseband processing board in normal operation may be any one of the baseband processing boards in normal operation, or may be the one with a lowest traffic load in the baseband processing boards in normal operation.

Further, in practice, a power-off operation can be preformed to the failed module to avoid unnecessary waste of power consumption.

Step 63: operating in the following steps: obtaining the baseband processing resources required for operation via the backplane, providing the obtained baseband processing resources to the corresponding RRU via the first direct path and the optical module, and supplying the optical module with power by the power supply module of the baseband processing board itself.

The specific workflow of the method shown in FIG. 6 may refer to the corresponding illustration in the device embodiment shown in FIG. 4, which will not be repeated here.

In summary, with the solution described in the disclosure, implementation costs can be reduced significantly. Furthermore, the method described in the disclosure can be simply and easily implemented, which is worth to be applied for BBU products.

The described above are just preferred embodiments of the disclosure, which should not be interpreted as limiting the disclosure, any alternations, modifications, equivalents and the like made to the embodiments within the spirit and principle of the disclosure should fall within the scope of protection of the disclosure.

The invention claimed is:

1. A baseband processing unit, comprising: a backplane and at least two baseband processing boards, wherein each of the baseband processing boards comprises a baseband processing module, a power supply module and an optical module, and at least one of the baseband processing boards further comprises: a first direct path connected in parallel with the baseband processing module and a second direct path connected in parallel with the power supply module;

in the case that failures occur on both the baseband processing module and the power supply module in a first baseband processing board comprising the first direct path and the second direct path, the first baseband processing board operates in a first operation mode, wherein the first operation mode comprises: obtaining baseband processing resources and power supply required for operation via the backplane, providing the obtained baseband processing resources to a corresponding radio remote unit via the first direct path and the optical module, and providing the obtained power supply to the optical module via the second direct path; and in the case that a failure occurs on the baseband processing module in the first baseband processing board, but no failure occurs on the power supply module in the first baseband processing board, the first baseband processing board operates in a second operation mode, wherein the second operation mode comprises: obtaining the baseband processing resources required for operation via the backplane, providing the obtained baseband processing resources to the corresponding radio remote unit via the first direct path and the optical module, and supplying the optical module with power by the power supply module of the baseband processing board.

2. The baseband processing unit according to claim 1, further comprising:

a main control transmission clock board adapted to detect an operation state of the first baseband processing board, and to control the first baseband processing board to operate in an operation mode corresponding to the detection result.

3. The baseband processing unit according to claim 1, wherein the first baseband processing board further comprises a first switch and a second switch;

the first switch is adapted to connect the optical module with the first direct path or the baseband processing module;

the second switch is adapted to connect the optical module with the power supply module or the second direct path;

one end of the first direct path that is not connected with the first switch is connected with the backplane, and one end of the second direct path that is not connected with the second switch is connected with the backplane; and in the case that the first baseband processing board operates in the first operation mode, the first switch is connected with the first direct path, and the second switch is connected with the second direct path; and in the case that the first baseband processing board operates in the second operation mode, the first switch is connected with the first direct path, and the second switch is connected with the power supply module.

4. The baseband processing unit according to claim 2, wherein the power supply obtained by the first baseband processing board is provided by a power supply module in the main control transmission clock board, or provided by a power supply module in a baseband processing board in normal operation.

5. The baseband processing unit according to claim 1, wherein the baseband processing resources obtained by the first baseband processing board is provided by a baseband processing board in normal operation.

6. A baseband processing board, comprising: a baseband processing module, a power supply module and an optical module, wherein the baseband processing board further comprises a first direct path connected in parallel with the baseband processing module and a second direct path connected in parallel with the power supply module;

in the case that failures occur on both the baseband processing module and the power supply module, the baseband processing board operates in a first operation mode, wherein the first operation mode comprises: obtaining baseband processing resources and power supply required for operation via a backplane in a baseband processing unit with the baseband processing board, providing the obtained baseband processing resources to a corresponding radio remote unit via the first direct path and the optical module, and providing the obtained power supply to the optical module via the second direct path;

in the case that a failure occurs on the baseband processing module but no failure occurs on the power supply module, the baseband processing board operates in a second operation mode, wherein the second operation mode comprises: obtaining the baseband processing resources required for operation via the backplane, providing the obtained baseband processing resources to the corresponding radio remote unit via the first direct path and the optical module, and supplying the optical module with power by the power supply module of the baseband processing board.

7. The baseband processing board according to claim 6, further comprising: a first switch and a second switch, wherein the first switch is adapted to connect the optical module with the first direct path or the baseband processing module;

the second switch is adapted to connect the optical module with the power supply module or the second direct path;

one end of the first direct path that is not connected with the first switch is connected with the backplane, and one end of the second direct path that is not connected with the second switch is connected with the backplane;

in the case that the baseband processing board operates in the first operation mode, the first switch is connected with the first direct path, and the second switch is connected with the second direct path; and in the case that the baseband processing board operates in the second operation mode, the first switch is connected with the first direct path, and the second switch is connected with the power supply module.

8. A failure processing method for a baseband processing board in a baseband processing unit, comprising:

switching, by a first baseband processing board, operation modes of the first baseband processing board according to an obtained operation mode switching instruction, wherein the operation modes comprise a first operation mode and a second operation mode;

in the case that the operation mode of the first baseband processing board is switched to the first operation mode, obtaining baseband processing resources and power supply required for operation via the backplane, providing the obtained baseband processing resources to a corresponding radio remote unit via the first direct path and the optical module, and providing the obtained power supply to the optical module via the second direct path; and in the case that the operation mode of the first baseband processing board is switched to the second operation mode, obtaining the baseband processing resources required for operation via the backplane, providing the obtained baseband processing resources to the corresponding radio remote unit via the first direct path and the optical module, and supplying the optical module with power by the power supply module of the first baseband processing board.

9. The method according to claim 8, wherein the obtained operation mode switching instruction is sent from a main control transmission clock board in the baseband processing unit with the first baseband processing board.

10. The method according to claim 8, wherein a power supply obtained by the first baseband processing board is provided by a power supply module in a main control transmission clock board in the baseband processing unit with the first baseband processing board, or provided by a power supply module in a baseband processing board in normal operation in the baseband processing unit with the first baseband processing board.

11. The method according to claim 8, wherein the baseband processing resources obtained by the first baseband processing board is provided by a baseband processing board in normal operation in the baseband processing unit with the first baseband processing board.

12. The method according to claim 11, wherein the baseband processing board in normal operation is any one of the baseband processing boards in normal operation, or a baseband processing board with a lowest traffic load in the baseband processing boards in normal operation.

* * * * *